United States Patent Office 2,706,196
Patented Apr. 12, 1955

2,706,196

D,L-DIHYDRO-NOR-LYSERGYL-GLYCINAMIDE

Arthur Stoll, Arlesheim, and Jürg Rutschmann, Basel, Switzerland, assignors to Sandoz A. G., Basel, Switzerland, a Swiss firm No Drawing. Application November 26, 1952,
Serial No. 322,791

Claims priority, application Switzerland
November 30, 1951

1 Claim. (Cl. 260—285.5)

The present invention relates to D,L-dihydro-nor-lysergyl-glycinamide and to the preparation thereof.

In accordance with the present invention, D,L-dihydro-nor-lysergyl-glycinamide (VI) is obtained by converting a racemic dihydro-nor-lysergic acid ester (I) via the carbobenzoxy derivative (II) and the hydrazide (III) thereof into the carbobenzoxy-dihydro-nor-lysergic acid-azide (IV), reacting the latter with glycocollamide to form compound (V) and then removing the carbobenzoxy group by catalytic reduction:

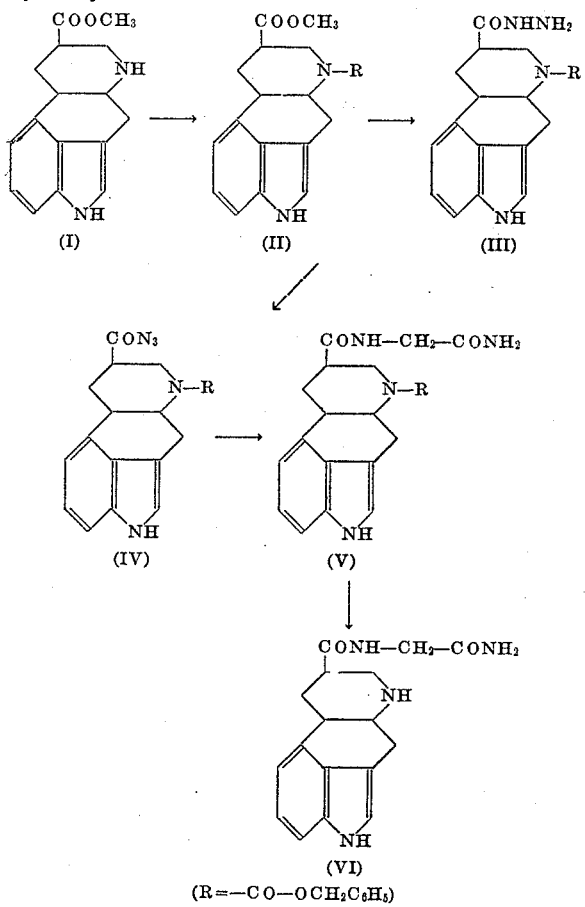

(R=—CO—OCH$_2$C$_6$H$_5$)

To this end, for example, D,L-dihydro-nor-lysergic acid-methylester (I) is reacted with carbobenzoxy chloride and the resultant D,L-carbobenzoxy-dihydro-nor-lysergic acid-methylester (II) is reacted with anhydrous hydrazine, after which the thus-obtained hydrazide (III) is converted into the corresponding azide (IV) by treatment with nitrous acid. The D,L-carbobenzoxy-dihydro-nor-lysergic acid-azide is condensed with glycocollamide and the resulting product (V) is reduced with catalytically activated hydrogen, whereby the D,L-dihydro-nor-lysergyl-glycinamide (VI) is obtained.

The thus-prepared, hitherto-unknown, D,L-dihydro-nor-lysergyl-glycinamide is a colorless substance which crystallizes from water in the form of clusters of needles, melting at 173–176° C. The new glycinamide is characterized by unexpected pharmacological activity, being useful as an oxytocic (promoting uterine contraction). For this purpose, it may be administered for example orally. The activity on the uterus is 3–4 times greater than that of ergonovine.

The following example sets forth, by way of illustration, the presently-preferred method of preparing the new glycinamide of this invention. In the said example, the relationship between part by weight and part by volume is the same as that between the milligram and the milliliter. Temperatures are in degrees centigrade.

EXAMPLE (a) *Preparation of D,L-carbobenzoxy-dihydro-nor-lysergic acid-methylester*

370 parts by weight of D,L-dihydro-nor-lysergic acid-methyl ester are dissolved in 7 parts by volume of anhydrous pyridine after which, at —15°, 2 parts by volume of carbobenzoxy chloride are added. After the mixture has been allowed to stand overnight, excess chloride is decomposed by the addition of 3 parts by volume of water, and the mixture allowed to stand for about 5 minutes, after which it is poured into 75 parts by volume of 2-normal hydrochloric acid. The product—D,L-carbobenzoxy-dihydro-nor-lysergic acid-methylester—separates out as beautiful crystals; yield 350 parts by weight. 100 parts by weight of unconverted initial ester are recovered from the mother liquor by making the latter alkaline and shaking out with chloroform. The acyl derivative, upon recrystallization from ethanol, has a melting point (corrected) of 237–239° (in vacuo).

(b) *Preparation of D,L-carbobenzoxy-dihydro-nor-lysergic acid-hydrazide*

A mixture of 350 parts by weight of D,L,-carbobenzoxy-dihydro-nor-lysergic acid-methylester, 5 parts by volume of anhydrous hydrazine and 10 parts by volume of butanol is warmed for 2 hours on the water-bath and then allowed to stand overnight. Upon concentration of the mixture, the desired D,L-carbobenzoxy-dihydro-nor-lysergic acid-hydrazide crystallizes out. Recrystallized from ethanol, it has a melting point (corrected) of 213–215° (in vacuo). The yield is quantitative.

(c) *Preparation of D,L-carbobenzoxy-dihydro-nor-lysergic acid-azide*

350 parts by weight of D,L-carbobenzoxy-dihydro-nor-lysergic acid-hydrazide are dissolved in a mixture of 5 parts by volume of hydrochloric acid, 25 parts by volume of glacial acetic acid and 25 parts by volume of water, and the solution is cooled in ice-water. Then, while stirring intensively, 1-normal aqueous sodium nitrite solution is added until a yellow coloration begins to appear (about 0.9 part by volume). Stirring is continued for an additional five minutes, and then the mixture is extracted three times with ice-cold ethyl acetate. The extracts are washed with ice-water and with chilled aqueous sodium bicarbonate solution, and are then rapidly dried over sodium sulfate. The thus-obtained solution of D,L-carbobenzoxy-dihydro-nor-lysergic acid-azide is subjected for several minutes to the suction action of a water-jet vacuum pump in order to remove carbon dioxide, after which it is ready for use in the next step of the process.

(d) *Preparation of D,L-carbobenzoxy-dihydro-nor-lysergyl-glycinamide*

The solution of D,L-carbobenzoxy-dihydro-nor-lysergic acid-azide (about 150 parts by volume), prepared according to paragraph (c) supra, is combined at 0° with a solution of 250 parts by weight of glycinamide in 50 parts by volume of isopropanol, and the reaction mixture allowed to stand for 24 hours in the ice-chest. It is then washed with water and aqueous sodium bicarbonate solution, evaporated under reduced pressure, and the residue dissolved in 10 parts by volume of acetone. The solution is chromatographed on 20 parts by weight of aluminum oxide and two sharply separated fractions are obtained, the second fraction containing the desired D,L-carbobenzoxy-dihydro-nor-lysergyl-glycinamide. The latter crystallizes immediately from methanol in the form of rhombohedral platelets having a melting point (corrected) of 245–248° (in vacuo). The yield amounts to 280 parts by weight.

(e) *Preparation of D,L-dihydro-nor-lysergyl-glycinamide*

280 parts by weight of D,L-carbobenzoxy-dihydro-nor-lysergyl-glycinamide are made up into a paste in 40 parts by volume of ethanol containing 0.5 part by volume of 2-normal hydrochloric acid, and are then shaken for 4 hours with palladium black under hydrogen. The catalyst is then filtered off and the solvent distilled off under reduced pressure. The residue is dissolved in several parts by volume of water and the solution, which contains the hydrochloride of D,L-dihydro-nor-lysergyl-glycinamide, is filtered. Upon addition of ammonia to the filtrate, the free base crystallizes out. Recrystallized from dilute methanol, the obtained needle bundles melt at 173–176°. The yield (180 parts by weight) is practically quantitative.

Having thus disclosed the invention, what is claimed is:
D,L-dihydro-nor-lysergyl-glycinamide.

References Cited in the file of this patent

UNITED STATES PATENTS 2,589,978     Stoll _____ Mar. 18, 1952

OTHER REFERENCES

Stoll: Helvetica Chim. Acta, vol. 33, Fasciculus 1 (1950), No. 18, page 109.